United States Patent
Zhu

(10) Patent No.: US 11,956,817 B2
(45) Date of Patent: Apr. 9, 2024

(54) COMMUNICATION METHOD, APPARATUS AND SYSTEM IN UNLICENSED SPECTRUMS

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 418 days.

(21) Appl. No.: 17/296,121

(22) PCT Filed: Nov. 29, 2018

(86) PCT No.: PCT/CN2018/118287
§ 371 (c)(1),
(2) Date: May 21, 2021

(87) PCT Pub. No.: WO2020/107348
PCT Pub. Date: Jun. 4, 2020

(65) Prior Publication Data
US 2022/0015142 A1  Jan. 13, 2022

(51) Int. Cl.
*H04W 74/0808* (2024.01)
*H04W 16/14* (2009.01)

(52) U.S. Cl.
CPC ....... *H04W 74/0808* (2013.01); *H04W 16/14* (2013.01)

(58) Field of Classification Search
CPC .......................... H04W 74/0808; H04W 16/14
See application file for complete search history.

(56) References Cited

U.S. PATENT DOCUMENTS

| | | | | |
|---|---|---|---|---|
| 2012/0008599 A1* | 1/2012 | Marin | ................. | H04W 74/006 370/336 |
| 2016/0218819 A1* | 7/2016 | Yang | ................. | H04L 12/40045 |

FOREIGN PATENT DOCUMENTS

WO  WO 2015/113199 A1  8/2015

OTHER PUBLICATIONS

PCT/CN2018/118287 English translation of International Search Report dated Jul. 25, 2019, 2 pages.

* cited by examiner

*Primary Examiner* — Duc C Ho
(74) *Attorney, Agent, or Firm* — COZEN O'CONNOR

(57) ABSTRACT

A communication method in an unlicensed spectrum includes: monitoring an occupancy state of an unlicensed spectrum; when a first indication signal sent by a second device occupying the unlicensed spectrum is detected, stopping monitoring the occupancy state of the unlicensed spectrum; and obtaining information included in the first indication signal, and determining a target detection behavior based on the information included in the first indication signal.

20 Claims, 5 Drawing Sheets

COMMUNICATION METHOD, APPARATUS AND SYSTEM IN UNLICENSED SPECTRUMS

CROSS-REFERENCE TO RELATED APPLICATION

This application is the U.S. national phase application of International Application No. PCT/CN2018/118287, filed on Nov. 29, 2018, the entire contents of which are incorporated herein by reference for all purposes.

TECHNICAL FIELD

The disclosure relates to the field of communication technology, and more particularly to a method, an apparatus and a system for detecting a channel in an unlicensed spectrum.

BACKGROUND

In the related art, a communication method in an unlicensed spectrum includes: a sending device monitors an occupancy state of the unlicensed spectrum before data transmission; when it is determined that the unlicensed spectrum is in an occupied state, the occupancy state of the unlicensed spectrum is continuously monitored until it is determined that the unlicensed spectrum is in an idle state and the unlicensed spectrum is then occupied for the data transmission. Continuously monitoring the occupancy state of the unlicensed spectrum by the sending device will lead to more energy consumption.

SUMMARY

According to a first aspect of the disclosure, a communication method in an unlicensed spectrum includes: monitoring by a first device, an occupancy state of an unlicensed spectrum, wherein the occupancy state comprises an occupied state or an idle state; stopping monitoring the occupancy state of the unlicensed spectrum when a first indication signal sent by a second device that occupies the unlicensed spectrum is detected by the first device, wherein the first indication signal is configured to indicate that the unlicensed spectrum is occupied by the second device; and obtaining by the first device, information included in the first indication signal and executing a target detection behavior based on the information included in the first indication signal.

According to a second aspect of the disclosure, a communication method in an unlicensed spectrum includes: monitoring by a second device, an occupancy state of an unlicensed spectrum, wherein the occupancy state comprises an occupied state or an idle state; occupying by the second device, the unlicensed spectrum for sending second target data to the second target device when it is monitored by the second device that the unlicensed spectrum is in the idle state; sending by the second device, a first indication signal, so that when the first indication signal is detected by a first device that monitors the occupancy state of the unlicensed spectrum, monitoring the occupancy state of the unlicensed spectrum is stopped, information included in the first indication signal is obtained and a target detection action is executed based on the information included in the first indication signal, wherein the first indication signal is configured to indicate that the unlicensed spectrum is occupied by the second device.

According to a third aspect of the disclosure, an electronic device includes a processor and a memory storing computer programs executable by the processor. The processor is configured to monitor an occupancy state of an unlicensed spectrum, wherein the occupancy state comprises an occupied state or an idle state; stop monitoring the occupancy state of the unlicensed spectrum when a first indication signal sent by a second device that occupies the unlicensed spectrum is detected, wherein the first indication signal is configured to indicate that the unlicensed spectrum is occupied by the second device; and obtain information included in the first indication signal and executing a target detection behavior based on the information included in the first indication signal.

BRIEF DESCRIPTION OF THE DRAWINGS

In order to more clearly describe the technical solutions in the embodiments of the disclosure, the accompanying drawings used in the description of the embodiments would be briefly introduced below. The accompanying drawings in the following description are only for some embodiments of the disclosure. For those skilled in the art, other drawings may be obtained based on these drawings without creative work.

DETAILED DESCRIPTION

In order to make the objectives, technical solutions, and advantages of the disclosure clearer, the embodiments of the disclosure are further described in detail below with reference to the accompanying drawings.

The continuous emergence of new Internet applications such as augmented reality (AR), virtual reality (VR) and vehicle-to-vehicle communication has put forward higher requirements on wireless communication technology, and has promoted continuous evolution of wireless communication technology to meet application requirements. Currently, cellular mobile communication technology is in the evolution stage of a new generation of technology, in which one of the important features is to support flexible configuration of multiple service types.

Different service types have different requirements for wireless communication technology. For example, the enhanced mobile broad band (eMBB) mainly focuses on larger bandwidth and higher speed, the ultra-reliable low latency communication (URLLC) mainly focuses on higher reliability and lower delay, and the massive machine type communication (mMTC) mainly focuses on the larger number of connections.

With the promotion of service requirements, only using licensed spectrum cannot meet the service requirements of cellular mobile communication systems. In view of this, the 3rd generation partnership project (3GPP) proposes a license assisted access mechanism (LAA), which assists to use unlicensed spectrums through licensed spectrums and deploys cellular mobile communication system to unlicensed spectrums. The use of unlicensed frequency bands needs to meet preset rules. In addition, since there may be other mobile communication systems on the unlicensed frequency bands, such as a wireless fidelity (Wi-Fi) system, a Zigbee system, etc., the issue of coexistence between different mobile communication systems needs to be considered.

In the communication process for the unlicensed spectrums, there is a problem of hidden stations: when the devices A and B that are invisible to each other (i.e., wireless signals cannot reach each other) transmit data simultaneously with the device C to which the signals of both devices may reach in the unlicensed spectrum, a signal interference may occur since neither device A nor device B may detect the signals of other side via the unlicensed spectrum and the two devices thus consider that the unlicensed spectrum is in an idle state at this time to perform data exchanges simultaneously with the device C.

In view of the above problem, an operating mechanism of request to send (RTS) or clear to send (CTS) protocol is proposed in the IEEE 802.11 standard by the Institute of Electrical and Electronics Engineers (IEEE). The details are shown below.

Figure 1:
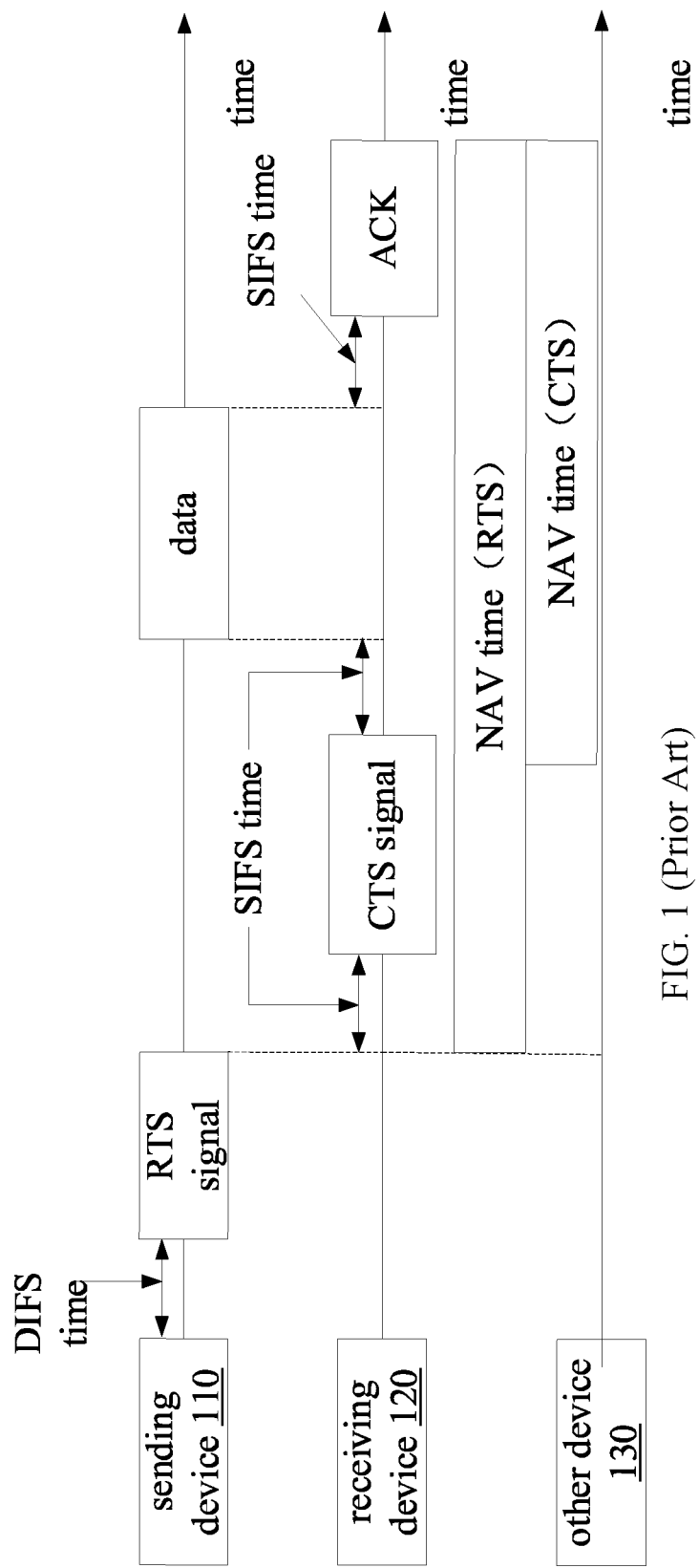
FIG. 1 is a schematic diagram illustrating operating mechanism of the RTS/CTS protocol in the IEEE 802.11 standard.

FIG. 1 illustrates the operating mechanism of the RTS/CTS protocol in the IEEE 802.11 standard.

A sending device 110 and a receiving device 120 implement the handshake by exchanging the sending of RTS signal and CTS signal, and clear the channels around the sending device and the receiving device through the time fields carried in the RTS signal and CTS signal before completing data transmission and corresponding feedback.

The sending device 110 broadcasts the RTS signal after monitoring an idle channel in carriers and backing off a distributed inter frame space (DIFS) time.

Other devices 130 that have monitored the RTS signal back off based on a network allocation vector (NAV) time carried in the RTS signal. The NAV time carried in the RTS signal includes an overall time required for the sending device 110 to send subsequent data and receive an acknowledgement (ACK).

After receiving the RTS signal, the receiving device 120 broadcasts the CTS signal after a short interframe space (SIFS) time.

Other devices 130 that have monitored the CTS signal back off based on a NAV time carried in the CTS signal. The NAV time carried in the CTS signal includes the time required from the end of the CTS signal to the completion of data transmission and performing a corresponding ACK.

There is a listen before talk (LBT) mechanism in the LAA mechanism: the sending device 110 needs to continuously detect the occupancy state of the unlicensed spectrum before sending data. If the unlicensed spectrum is in the occupied state, the sending device can occupy the unlicensed spectrum to send data only after determining the licensed spectrum is in the idle state again. Since the sending device needs to continuously detect whether the channel is idle before determining that the channel is in the idle state, more energy consumption is caused.

Figure 2:
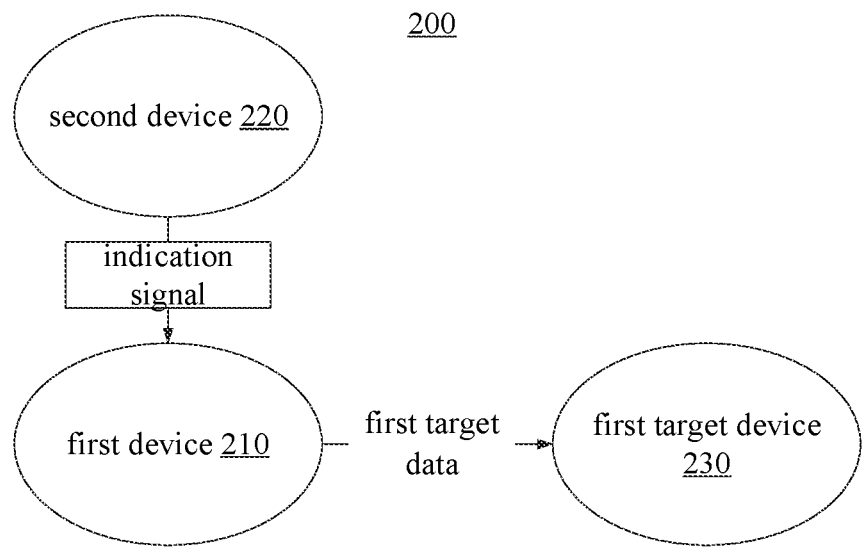
FIG. 2 is a schematic diagram illustrating a communication system architecture according to an exemplary embodiment of the disclosure.

FIG. 2 illustrates a schematic diagram of a communication system architecture according to an exemplary embodiment of the disclosure. As illustrated in FIG. 2, the communication system 200 includes a first device 210, a second device 220 and a first target device 230.

The first device 210 may be a user equipment (UE) or an access network device. When the first device 210 is an access network device, the access network device may be a base station, the specific implementation of which is not limited in the embodiment of the present invention.

The second device 220 may be a UE or an access network device. When the second device 220 is an access network device, the access network device may be a base station, the specific implementation of which is not limited in the embodiment of the disclosure.

The first device 210 may send data to the first target device 230 through an unlicensed spectrum. The occupancy state of the unlicensed spectrum needs to be determined before sending data from the first device 210 to the first target device 230. Optionally, the first target device 230 is a UE.

When the first device 210 or the second device 220 is a base station, the base station is usually provided with a packet data convergence protocol (PDCP) layer, a radio link control protocol (RLC) layer, and a media access control (MAC) layer protocol stack, a physical (PHY) layer protocol stack.

Figure 3:
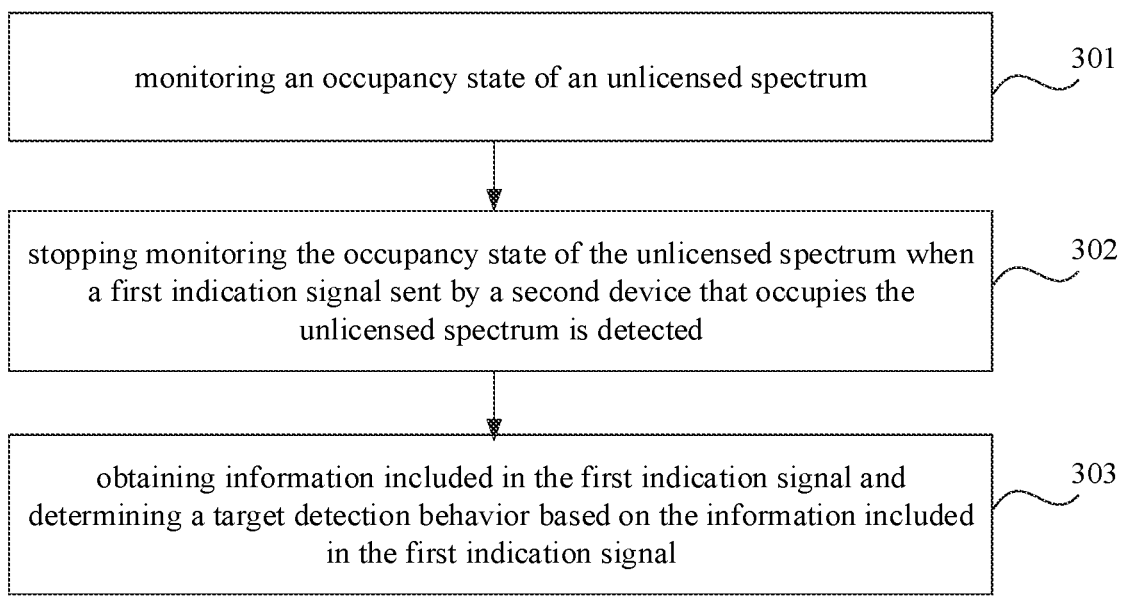
FIG. 3 is a flowchart illustrating a communication method in an unlicensed spectrum according to an exemplary embodiment of the disclosure.

FIG. 3 illustrates a communication method in an unlicensed spectrum according to an exemplary embodiment of the disclosure. The method may be applied to the communication system 200 in the embodiment of FIG. 2. The method includes the following blocks 301-303.

In block 301, an occupancy state of an unlicensed spectrum is monitored.

Exemplarily, when the first target data enters a queue to be transmitted and the first device needs to transmit the first target data to the first target device through the unlicensed spectrum, the first device detects the occupancy state of the unlicensed spectrum based on the LBT mechanism.

The occupancy state of the unlicensed spectrum includes an occupied state and an idle state. The occupied state indicates that the unlicensed spectrum is occupied by other devices for data transmission. The idle state indicates that the unlicensed spectrum is not occupied by other devices for data transmission.

Optionally, when the first device is a base station, the occupancy state of the unlicensed spectrum is monitored with a clear channel assessment (CCA) technology in the physical layer.

In block 302, monitoring the occupancy state of the unlicensed spectrum is stopped when a first indication signal sent by the second device that occupies the unlicensed spectrum is detected.

Exemplarily, the first device determines that the unlicensed spectrum is in the occupied state and stops monitoring the occupancy state of the unlicensed spectrum after receiving the first indication signal in a process of monitoring the occupancy state of the unlicensed spectrum.

The first indication signal is the information sent by the second device through the unlicensed spectrum when the second device is occupying the unlicensed spectrum for data transmission. The first indication signal is configured to indicate that the unlicensed spectrum is occupied by the second device.

In block 303, information included in the first indication signal is obtained, and a target detection behavior is determined based on the information included in the first indication signal.

Optionally, the information included in the first indication signal includes at least one of first indication information, second indication information, third indication information, and fourth indication information.

The first indication information is configured to indicate information of a communication system that occupies the unlicensed spectrum for data transmission. The communication system includes a cellular mobile communication system (hereinafter referred to as a cellular system), a Wi-Fi system, or a Zigbee system. For example, a set of communication systems supported by this mechanism is {cellular system, Wi-Fi system, Zigbee system}. When the first device is a UE, the set of communication systems may be pre-stored in the first device, or sent to the first device by an access network device that establishes a connection with the first device.

Optionally, when the communication system in which the second device occupies the unlicensed spectrum for data transmission is a cellular system, for example, when the second device occupies the unlicensed spectrum for sending second target data to a second target device through the cellular system, the first indication information includes an identifier of the cellular system and/or a feature code of the cell to which the second device belongs.

When the communication system in which the second device occupies the unlicensed spectrum for data transmission is a Wi-Fi system, for example, when the second device occupies the unlicensed spectrum for sending the second target data to the second target device through the Wi-Fi system, the first indication information includes an identifier of the Wi-Fi system and/or information related to the Wi-Fi system.

When the communication system in which the second device occupies the unlicensed spectrum for data transmission is a Zigbee system, for example, when the second device occupies the unlicensed spectrum for sending the second target data to the second target device through the Zigbee system, the first indication information includes an identifier of the Zigbee system and/or information related to the Zigbee system.

The second indication information is configured to indicate a unique identifier information of the second device. Optionally, when the second device is an access network device, the unique identifier information includes a physical layer identifier of the second device; when the second device is a UE, the unique identifier information includes a device identifier of the second device.

The third indication information is configured to indicate a transmission attribute of the second device. Optionally, when the second device is a sending end in the data transmission, the third indication information includes a sending end identifier for indicating that the second device is the sending end in the data transmission. Optionally, when the second device is a receiving end in data transmission, the third indication information includes a receiving end identifier for indicating that the second device is the receiving end in the data transmission.

The fourth indication information is configured to indicate a remaining time when the unlicensed spectrum is occupied by the second device.

The terminal executes the target detection behavior based on the information included in the first indication signal. The target detection behavior includes but is not limited to: occupying the unlicensed spectrum for sending first target data to the first target device or monitoring the occupancy state of the unlicensed spectrum again after backing off the remaining time.

Optionally, when the terminal monitors that the unlicensed spectrum is in an idle state for a predefined time, it occupies the unlicensed spectrum for sending the first target data to the first target device.

Optionally, when the first device determines that the second device belongs to the same cell as the first device based on the information included in the first indication signal, the first device occupies the unlicensed spectrum for sending the first target data to the first target device. Optionally, when the first device determines that the second device is the sending end in the data transmission based on the information included in the first indication signal, the first device occupies the unlicensed spectrum for sending the first target data to the first target device. Optionally, when the first device obtains the remaining time that the second device occupies the unlicensed spectrum based on the information included in the first indication signal, the first device monitors the occupancy state of the unlicensed spectrum again after backing off the remaining time Exemplarily, the first device detects communication system information that the second device occupies the unlicensed spectrum based on the first indication information in the first indication signal. When the first indication information includes a feature code of the cell to which the second device belongs, it is detected whether the feature code corresponds to the cell to which the first device belongs. When the feature code corresponds to the cell to which the first device belongs, it is determined that the second device belongs to the same cell as the first device, and the unlicensed spectrum is occupied by the first device for sending the first target data to the first target device. When the first device and the second device belong to the same cell, data interference may not occur and data may be directly transmitted since the two devices must be scheduled by the same access network device for data transmission.

Exemplarily, the first device obtains the third indication information in the first indication signal. When the third indication information includes the sending end identifier, it is determined that the second device is the sending end in the data transmission, and the unlicensed spectrum is occupied by the first device for sending the first target data to the first target device. When the second device is the sending end, information interference may not occur when the first device sends data through the unlicensed spectrum occupied by the second device. Therefore, the first device may directly transmit data.

Exemplarily, the first device obtains the fourth indication information in the first indication signal, backing off the remaining time based on a remaining time indicated in the fourth indication information, and monitors the occupancy state of the unlicensed spectrum again after backing off the remaining time. Since the terminal does not need to continuously monitor the occupancy state of the unlicensed spectrum, energy consumption is reduced to a certain extent.

In summary, in the embodiments of the disclosure, the first device stops monitoring the occupancy state of the unlicensed spectrum after monitoring the first indication signal sent by the second device that occupies the unlicensed spectrum, and determines the target detection behavior based on the information included in the first indication signal. Since in the situation where the first indication signal is received by the terminal and the unlicensed spectrum is occupied, the terminal does not need to continuously detect the occupancy state of the unlicensed spectrum until it is determined that the unlicensed spectrum is in the idle state, the energy consumption of the first device is reduced to a certain extent.

Figure 4:
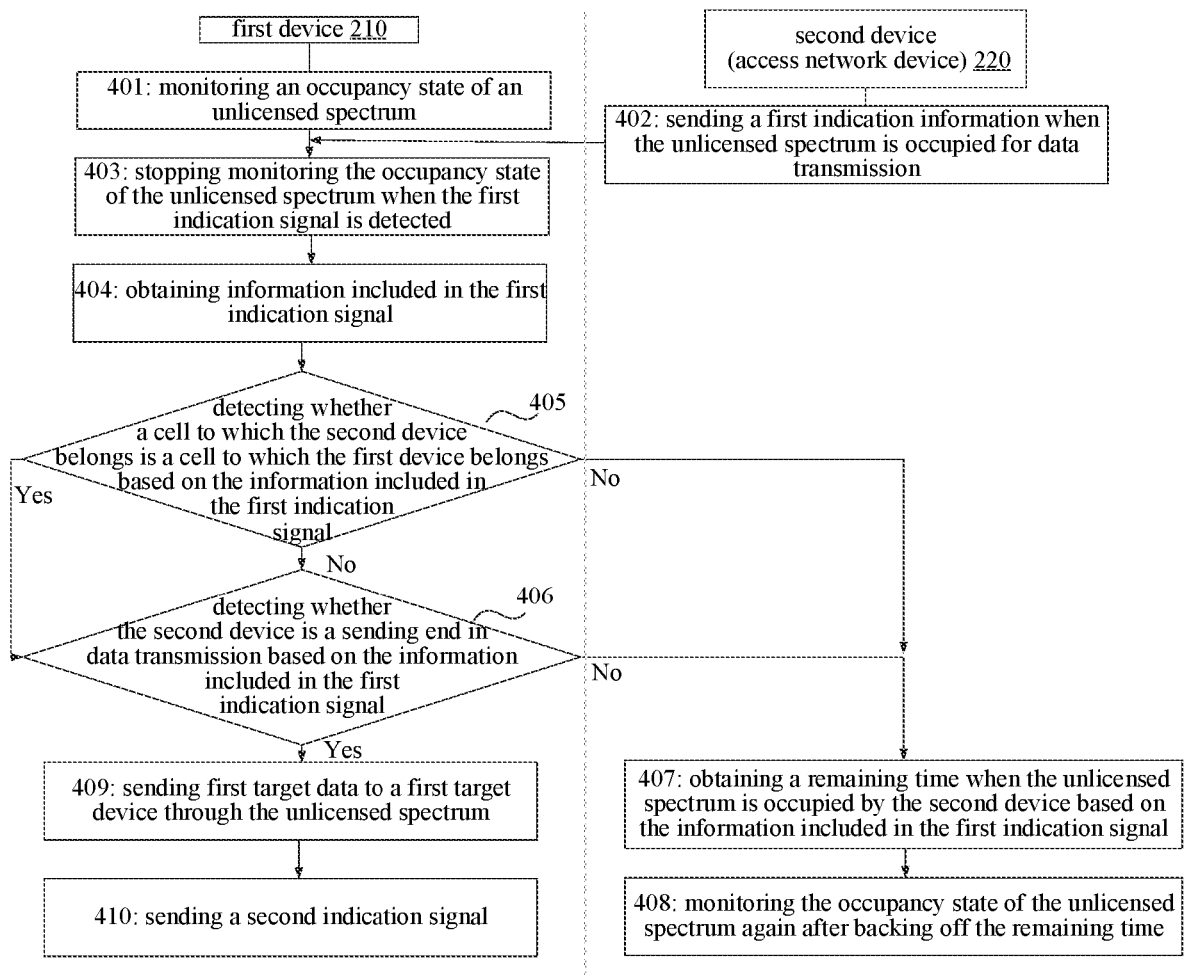
FIG. 4 is a flowchart illustrating a communication method in an unlicensed spectrum according to an exemplary embodiment of the disclosure.

FIG. 4 illustrates a communication method in an unlicensed spectrum according to an exemplary embodiment of the disclosure. This method may be applied to the communication system 200 in the embodiment of FIG. 2. The second device in this embodiment is an access network device. The method includes the following blocks 401-410.

In block 401, a first device monitors an occupancy state of an unlicensed spectrum.

For the method for the first device to monitor the occupancy state of the unlicensed spectrum, reference may be made to block 301 in the embodiment of FIG. 3, which may not be elaborated in detail herein.

In block 402, a first indication signal is sent when the unlicensed spectrum is occupied by a second device for data transmission.

Optionally, the second device monitors the occupancy state of the unlicensed spectrum. When it is detected that the unlicensed spectrum is in an idle state, monitoring the occupancy state of the unlicensed spectrum is stopped, and second target data is sent to a second target device through the unlicensed spectrum together with the first indication signal.

Optionally, the second device monitors the occupancy state of the unlicensed spectrum. When other indication signals sent by other devices that occupy the unlicensed spectrum are detected, monitoring the occupancy state of the unlicensed spectrum is stopped, and it is determined whether information included in the other indication signals meets a preset condition. When the information included in the other indication signal meets the preset condition, the second target data is sent to the second target device through the unlicensed spectrum together with the first indication signal. The preset condition includes: the other device belongs to the same cell as the second device, or the other device is a sending end in data transmission.

The action of sending the first indication signal by the second device includes but is not limited to: when the second device occupies the unlicensed spectrum for the data transmission, the second device sends the first indication signal every preset time interval; or the second device sends the first indication signal after occupying the unlicensed spectrum for data transmission for a preset time.

Exemplarily, the first indication signal may be an RRC (Radio Resource Control) signaling, an MAC CE (Media Access Control—Control Element) or physical layer signaling. The information included in the first indication signal includes at least one of first indication information, second indication information, third indication information, and fourth indication information.

The first indication information is configured to indicate communication system information that the unlicensed spectrum is occupied for the data transmission (including the cellular system identifier and/or feature code of the cell to which the second device belongs). The second indication information is configured to indicate a physical layer identifier of the second device. The third indication information is configured to indicate a transmission attribute of the second device. The fourth indication information is configured to indicate a remaining time when the unlicensed spectrum is occupied by the second device.

In block 403, the first device stops monitoring the occupancy state of the unlicensed spectrum when the first indication signal is detected.

Exemplarily, after receiving the first indication signal in the process of monitoring the occupancy state of the unlicensed spectrum, the first device determines that the unlicensed spectrum is in the occupied state and stops monitoring the occupancy state of the unlicensed spectrum.

Optionally, when the terminal monitors that the unlicensed spectrum is in the idle state for a predefined time, the terminal occupies the unlicensed spectrum for sending first target data to a first target device.

In block 404, the first device obtains information included in the first indication signal.

When the first indication signal includes the first indication information and/or the second indication information, it proceeds to block 405. When the first indication signal includes the third indication information, it proceeds to block 406. When the first indication signal includes the fourth indication information, it proceeds to block 407. When the first indication signal includes the first indication information and the third indication information, or the first indication signal includes the second indication information and the third indication information, or the first indication signal includes the first indication information, the second instruction information and the third instruction information, it may execute block 405 first and then block 406, or it may execute block 406 first and then block 405, or it may execute block 405 or block 406.

In block 405, the first device detects whether a cell to which the second device belongs is a cell to which the first device belongs based on the information included in the first indication signal.

Exemplarily, the first device may detect whether the cell to which the second device belongs is the cell to which the first device belongs through at least one of the two methods.

1) The first device determines that the communication system where the unlicensed spectrum is occupied is a cellular system based on a cellular system identifier in the first indication information, so as to obtain a feature code of the cell to which the second device belongs based on the first indication information and to detect whether the feature code corresponds to the cell to which the first device belongs. If the feature code corresponds to the cell to which the first device belongs, it is determined that the cell to which the second device belongs is the cell to which the first device belongs, proceeding to block 409. If the feature code does not correspond to the cell to which the first device belongs, it is determined that the cell to which the second device belongs is not the cell to which the first device belongs, proceeding to block 406.

After the first device establishes contact with the access network device of the cell to which it belongs, the access network device sends a signal including the feature code of the cell to the first device. The first device obtains the feature code of the cell to which it belongs after receiving the signal. After obtaining the feature code of the cell to which the second device belongs through the first indication information, the first device may detect whether said feature code is the same as the feature code of the cell to which the first device belongs, so as to detect whether the cell to which the second device belongs is the cell to which the first device belongs.

2) The first device determines that the communication system where the unlicensed spectrum is occupied is a cellular system based on a cellular system identifier in the first indication information, so as to obtain a physical layer identifier of the second device and to query whether said physical layer identifier is a physical layer identifier of the access network device of the cell to which the first device belongs. If said physical layer identifier is the physical layer identifier of the access network device of the cell to which the first device belongs, it is determined that the cell to which the second device belongs is the cell to which the first device belongs, proceeding to block 409. If said physical layer identifier is not the physical layer identifier of the access network device of the cell to which the first device belongs, it is determined that the cell to which the second device belongs is not the cell to which the first device belongs, proceeding to block 406.

After the first device establishes contact with the access network device of the cell to which it belongs, the access network device sends a signal including the physical layer identifier of the access network device of the cell to the first device. The first device obtains the physical layer identifier of the access network device of the cell to which it belongs after receiving the signal. After obtaining the physical layer identifier of the second device through the second indication information, the first device detects whether said physical layer identifier is the physical layer identifier of the access network device of the cell to which the first device belongs, so as to detect whether the cell to which the second device belongs is the cell to which the first device belongs.

In block 406, the first device detects whether the second device is a sending end in data transmission based on the information included in the first indication signal.

The first device obtains the transmission attribute of the second device based on the third indication information in the first indication signal. When the third indication information includes a sending end identifier, it is determined that the second device is the sending end in the data transmission, proceeding to block 409. When the third indication signal includes a receiving end identifier, it is determined that the second device is not the sending end in the data transmission, proceeding to block 407.

In block 407, the first device obtains a remaining time when the unlicensed spectrum is occupied by the second device based on the information included in the first indication signal.

When the first indication signal includes the fourth indication information and the first device determines that the cell to which the second device belongs is not the cell to which the first device belongs (the second device is not the sending end), the first device needs to back off so as to avoid the signal interference to the data transmission of second device. Optionally, when the first indication signal includes the fourth indication information without including the first indication information, the second indication information and the third indication information, the first device needs to back off. Optionally, when the first indication signal includes the fourth indication information without including the third indication information, the first device determines that the cell to which the second device belongs is not the cell to which the first device belongs and needs to back-off. Optionally, when the first indication signal includes the fourth indication information without including the first indication information and second indication information and the first device determines that the second device is not the sending end, the first device needs to back off.

The first device obtains the remaining time when the unlicensed spectrum is occupied by the second device based on the fourth indication information in the first indication signal, and the first device may use the remaining time as the back-off time.

In block 408, the first device monitors the occupancy state of the unlicensed spectrum again after backing off the remaining time.

The first device uses the remaining time as the back-off time, and starts monitoring the occupancy state of the unlicensed spectrum again after back-off a first occupancy time.

In block 409, the first device sends first target data to a first target device through the unlicensed spectrum.

When the first device determines that the cell to which the second device belongs is the cell to which the first device belongs or the first device determines that the second device is the sending end in the data transmission, the first device directly occupies the unlicensed spectrum for sending the first target data to the first target device.

In block 410, the first device sends a second indication signal.

When the first device occupies the unlicensed spectrum for sending the first target data to the first target device, the second indication signal is sent through the unlicensed spectrum after a preset time. Optionally, the first device sends the second indication signal through the unlicensed spectrum every preset time interval.

The second indication signal includes at least one of fifth indication information, sixth indication information, seventh indication information, and eighth indication information. The fifth indication information is configured to indicate the cell to which the first device belongs. Optionally, the fifth indication information may be the feature code of the cell to which the first device belongs. The sixth indication information is configured to indicate a unique identifier information of the first device. When the first device is a UE, the unique identifier information includes the device identifier of the first device. When the first device is an access network device, the unique identifier information includes a physical layer identifier of the first device. The seventh indication information is configured to indicate a transmission attribute of the first device. The eighth indication information is configured to indicate a remaining time when the unlicensed spectrum is occupied by the first device.

In summary, in the embodiments of the disclosure, when the cell to which the second device that occupies the unlicensed spectrum belongs is the cell to which the first device belongs, the first device directly sends the first target data to the first target device through the unlicensed spectrum. Since the first device does not need to continuously detect the unlicensed spectrum occupancy state until it is determined that the unlicensed spectrum is in the idle state before sending the first target data, the energy consumption of the first device is reduced.

Optionally, in the embodiments of the disclosure, when the second device that occupies the unlicensed spectrum is the sending end in the data transmission, the first device directly sends the first target data to the first target device through the unlicensed spectrum. Since the first device does not need to continuously detect the unlicensed spectrum occupancy state until it is determined that the unlicensed spectrum is in the idle state before sending the first target data, the energy consumption of the first device is reduced.

Optionally, in the embodiments of the disclosure, when the cell to which the second device belongs is not the cell to which the first device belongs and the second device is not the sending end, the first device obtains the remaining time included in the first indication signal when the unlicensed spectrum is occupied by the second device, and monitors the occupancy state of the unlicensed spectrum again after backing off the remaining time. Since the first device does not need to continuously detect the unlicensed spectrum occupancy state after determining that the unlicensed spectrum is occupied, the energy consumption of the first device is reduced.

Figure 5:
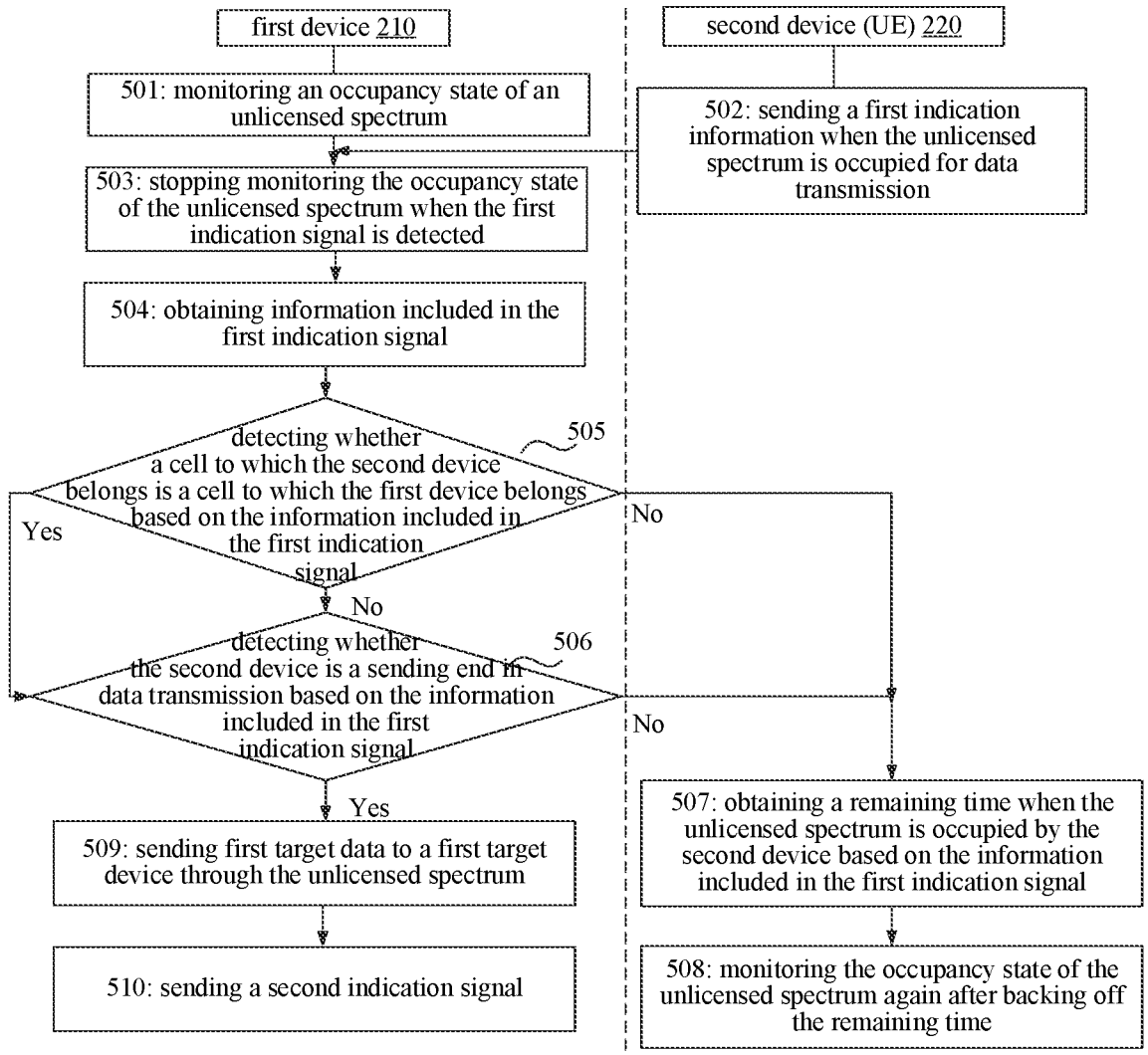
FIG. 5 is a flowchart illustrating a communication method in an unlicensed spectrum according to an exemplary embodiment of the disclosure.

FIG. 5 illustrates a communication method in an unlicensed spectrum according to an exemplary embodiment of the disclosure. This method may be applied to the communication system 200 in the embodiment of FIG. 2. The second device in this embodiment is a UE. The method includes the following actions 501-509.

In block 501, a first device monitors an occupancy state of an unlicensed spectrum.

For the method for the first device to monitor the occupancy state of the unlicensed spectrum, reference may be made to block 301 in the embodiment of FIG. 3, which may not be elaborated in detail herein.

In block 502, a first indication signal is sent when the unlicensed spectrum is occupied by a second device for data transmission.

Optionally, the second device monitors the occupancy state of the unlicensed spectrum. When it is detected that the unlicensed spectrum is in an idle state, monitoring the occupancy state of the unlicensed spectrum is stopped, and second target data is sent to a second target device through the unlicensed spectrum together with the first indication signal.

Optionally, the second device monitors the occupancy state of the unlicensed spectrum. When other indication signals sent by other devices that occupy the unlicensed spectrum are detected, monitoring the occupancy state of the unlicensed spectrum is stopped, and it is determined whether information included in the other indication signals meets a preset condition. When the information included in the other indication signal meets the preset condition, the second target data is sent to the second target device through the unlicensed spectrum together with the first indication signal. The preset condition includes: the other device belongs to the same cell as the second device, or the other device is a sending end in data transmission.

The action of sending the first indication signal by the second device includes but is not limited to: when the second device occupies the unlicensed spectrum for the data transmission, the second device sends the first indication signal every preset time interval; or the second device sends the first indication signal after occupying the unlicensed spectrum for data transmission for a preset time.

The information included in the first indication signal includes at least one of first indication information, second indication information, third indication information, and fourth indication information.

The first indication information is configured to indicate communication system information that the unlicensed spectrum is occupied for the data transmission. The second indication information is configured to indicate a device identifier of the second device. The third indication information is configured to indicate a transmission attribute of the second device. The fourth indication information is configured to indicate a remaining time when the unlicensed spectrum is occupied by the second device.

In block 503, the first device stops monitoring the occupancy state of the unlicensed spectrum when the first indication signal is detected.

Exemplarily, after receiving the first indication signal in the process of monitoring the occupancy state of the unlicensed spectrum, the first device determines that the unlicensed spectrum is in the occupied state and stops monitoring the occupancy state of the unlicensed spectrum.

Optionally, when the terminal monitors that the unlicensed spectrum is in the idle state for a predefined time, the terminal occupies the unlicensed spectrum for sending first target data to a first target device.

In block 504, the first device obtains information included in the first indication signal.

When the first indication signal includes the first indication information and/or the second indication information, it proceeds to block 505. When the first indication signal includes the third indication information, it proceeds to block 506. When the first indication signal includes the fourth indication information, it proceeds to block 507. When the first indication signal includes the first indication information and the third indication information, or the first indication signal includes the second indication information and the third indication information, or the first indication signal includes the first indication information, the second instruction information and the third instruction information, it may execute block 505 first and then block 506, or it may execute block 506 first and then block 505, or it may execute block 505 or block 506.

In block 505, the first device detects whether a cell to which the second device belongs is a cell to which the first device belongs based on the information included in the first indication signal.

Exemplarily, the first device may detect the first indication information includes a cellular system identifier. When the first indication information does not include the cellular system identifier, it may proceed to block 506. When the first indication information includes the cellular system identifier, it is determined that the communication system where the unlicensed spectrum is occupied is the cellular system, so as to obtain a feature code of the cell to which the second device belongs based on the first indication information and to detect whether the feature code corresponds to the cell to which the first device belongs. If the feature code corresponds to the cell to which the first device belongs, it is determined that the cell to which the second device belongs is the cell to which the first device belongs, proceeding to block 509. If the feature code does not correspond to the cell to which the first device belongs, it is determined that the cell to which the second device belongs is not the cell to which the first device belongs, proceeding to block 506 or block 507.

After the first device establishes contact with the access network device of the cell to which it belongs, the access network device sends a signal including the feature code of the cell to the first device. The first device obtains the feature code of the cell to which it belongs after receiving the signal. After obtaining the feature code of the cell to which the second device belongs through the first indication information, the first device may detect whether said feature code is the same as the feature code of the cell to which the first device belongs, so as to detect whether the cell to which the second device belongs is the cell to which the first device belongs.

In block 506, the first device detects whether the second device is a sending end in data transmission based on the information included in the first indication signal.

The first device obtains the transmission attribute of the second device based on the third indication information in the first indication signal. When the third indication information includes a sending end identifier, it is determined that the second device is the sending end in the data transmission, proceeding to block 509. When the third indication signal includes a receiving end identifier, it is determined that the second device is not the sending end in the data transmission, proceeding to block 507.

In block 507, the first device obtains a remaining time when the unlicensed spectrum is occupied by the second device based on the information included in the first indication signal.

When the first indication signal includes the fourth indication information and the first device determines that the cell to which the second device belongs is not the cell to which the first device belongs (the second device is not the sending end), the first device needs to back off so as to avoid the signal interference to the data transmission of second device. Optionally, when the first indication signal includes the fourth indication information without including the first indication information, the second indication information and the third indication information, the first device needs to back off. Optionally, when the first indication signal includes the fourth indication information without including the third indication information, the first device determines that the cell to which the second device belongs is not the cell to which the first device belongs and needs to back-off. Optionally, when the first indication signal includes the fourth indication information without including the first indication information and second indication information and the first device determines that the second device is not the sending end, the first device needs to back off.

The first device obtains the remaining time when the unlicensed spectrum is occupied by the second device based on the fourth indication information in the first indication signal, and the first device may use the remaining time as the back-off time.

In block 508, the first device monitors the occupancy state of the unlicensed spectrum again after backing off the remaining time.

The first device uses the remaining time as the back-off time, and starts monitoring the occupancy state of the unlicensed spectrum again after back-off a first occupancy time.

In block 509, the first device sends first target data to a first target device through the unlicensed spectrum.

When the first device determines that the cell to which the second device belongs is the cell to which the first device belongs or the first device determines that the second device is the sending end in the data transmission, the first device directly occupies the unlicensed spectrum for sending the first target data to the first target device.

In block 510, the first device sends a second indication signal.

When the first device occupies the unlicensed spectrum for sending the first target data to the first target device, the second indication signal is sent through the unlicensed spectrum after a preset time. Optionally, the first device sends the second indication signal through the unlicensed spectrum every preset time interval.

The second indication signal includes at least one of fifth indication information, sixth indication information, seventh indication information, and eighth indication information. The fifth indication information is configured to indicate the cell to which the first device belongs. Optionally, the fifth indication information may be the feature code of the cell to which the first device belongs. The sixth indication information is configured to indicate a unique identifier information of the first device. When the first device is a UE, the unique identifier information includes the device identifier of the first device. When the first device is an access network device, the unique identifier information includes a physical layer identifier of the first device. The seventh indication information is configured to indicate a transmission attribute of the first device. The eighth indication information is configured to indicate a remaining time when the unlicensed spectrum is occupied by the first device.

In summary, in the embodiments of the disclosure, when the cell to which the second device that occupies the unlicensed spectrum belongs is the cell to which the first device belongs, the first device directly sends the first target data to the first target device through the unlicensed spectrum. Since the first device does not need to continuously detect the unlicensed spectrum occupancy state until it is determined that the unlicensed spectrum is in the idle state before sending the first target data, the energy consumption of the first device is reduced.

Optionally, in the embodiments of the disclosure, when the second device that occupies the unlicensed spectrum is the sending end in the data transmission, the first device directly sends the first target data to the first target device through the unlicensed spectrum. Since the first device does not need to continuously detect the unlicensed spectrum occupancy state until it is determined that the unlicensed spectrum is in the idle state before sending the first target data, the energy consumption of the first device is reduced.

Optionally, in the embodiments of the disclosure, when the cell to which the second device belongs is not the cell to which the first device belongs and the second device is not the sending end, the first device obtains the remaining time included in the first indication signal when the unlicensed spectrum is occupied by the second device, and monitors the occupancy state of the unlicensed spectrum again after backing off the remaining time. Since the first device does not need to continuously detect the unlicensed spectrum occupancy state after determining that the unlicensed spectrum is occupied, the energy consumption of the first device is reduced.

Figure 6:
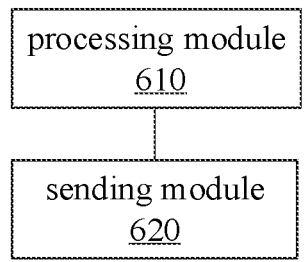
FIG. 6 is a structural block diagram illustrating a communication apparatus in an unlicensed spectrum according to an exemplary embodiment of the disclosure.

FIG. 6 illustrates a structural block diagram of a communication apparatus in an unlicensed spectrum according to an exemplary embodiment of the disclosure. The apparatus is applied to the first device 210 illustrated in FIG. 2. The apparatus includes a processing module 610 and a sending module 620.

The processing module 610 is configured to monitor an occupancy state of an unlicensed spectrum; stop monitoring the occupancy state of the unlicensed spectrum when a first indication signal sent by a second device that occupies the unlicensed spectrum is detected, in which the first indication signal is configured to indicate that the unlicensed spectrum is occupied by the second device; obtain information included in the first indication signal and execute a target detection behavior based on the information included in the first indication signal.

In an alternative embodiment, the information included in the first indication signal includes first indication information. The first indication information is configured to indicate information of a cell to which the second device belongs. The processing module 610 is further configured to obtain the first indication information included in the first indication signal, and determine whether the cell to which the second device belongs is a cell to which the first device belongs based on the first indication information. The sending module 620 is configured to send first target data to a first target device through the unlicensed spectrum when the cell to which the second device belongs is the cell to which the first device belongs.

In an alternative embodiment, the first indication information includes a feature code of the cell to which the second device belongs. The processing module 610 is further configured to determine whether the feature code corresponds to the cell to which the first device belongs, and determine that the second device and the first device belong to the same cell when the feature code corresponds to the cell to which the first device belongs.

In an alternative embodiment, the information included in the first indication signal includes second indication information. The second indication information is configured to indicate a physical layer identifier of the second device. The processing module 610 is further configured to obtain the second indication information included in the first indication signal, and determine the physical layer identity of the second device based on the second indication information; and query whether the physical layer identity of the second device a physical layer identifier of the access network device of the cell to which the first device belongs. The sending module 620 is further configured to send the first target data to the first target device through the unlicensed spectrum when the physical layer identifier of the second device is the physical layer identifier of the access network device of the cell to which the first device belongs.

In an alternative embodiment, the information included in the first indication signal includes third indication information. The third indication information is configured to indicate that the second device is a sending end in data transmission. The sending module 620 is further configured to send the first target data to the first target device through the unlicensed spectrum when the third indication information included in the first indication signal is obtained.

In an alternative embodiment, the information included in the first indication signal includes fourth indication information. The fourth indication information is configured to indicate a remaining time when the unlicensed spectrum is occupied by the second device. The processing module 610 is further configured to obtain fourth indication information included in the first indication signal; and monitor the occupancy state of the unlicensed spectrum again after backing off the remaining time based on the fourth indication information.

In an alternative embodiment, the sending module 620 is further configured to send a second indication signal after a preset time or send the second indication signal every preset time interval. The second indication signal is configured to indicate that the unlicensed spectrum is occupied by the first device.

The second indication signal includes at least one of fifth indication information, sixth indication information, seventh indication information, and eighth indication information. The fifth indication information is configured to indicate information of the cell to which the first device belongs. The sixth indication information is configured to indicate a unique identifier information of the first device. The unique identifier information comprises a device identifier of the first device when the first device is a user terminal and the unique identifier information comprises a physical layer identifier of the first device when the first device is an access network device. The seventh indication information is configured to indicate that the first device is a sending end in data transmission. The eighth indication information is configured to indicate a remaining time when the unlicensed spectrum is occupied by the first device.

Figure 7:
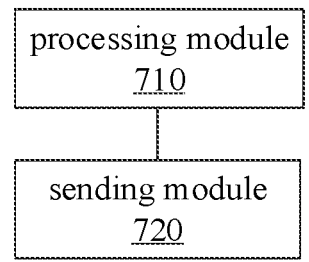
FIG. 7 is a structural block diagram illustrating a communication apparatus in an unlicensed spectrum according to an exemplary embodiment of the disclosure.

FIG. 7 illustrates a structural block diagram of a communication apparatus in an unlicensed spectrum according to an exemplary embodiment of the disclosure. The apparatus is applied to the second device 220 illustrated in FIG. 2. The apparatus includes a processing module 710 and a sending module 720.

The processing module 710 is configured to monitor an occupancy state of an unlicensed spectrum.

The sending module 720 is configured to occupy the unlicensed spectrum for sending second target data to the second target device when it is monitored that the unlicensed spectrum is in the idle state; send a first indication signal, so that when the first indication signal is detected by a first device that monitors the occupancy state of the unlicensed spectrum, monitoring the occupancy state of the unlicensed spectrum is stopped, information included in the first indication signal is obtained and a target detection action is executed based on the information included in the first indication signal. The first indication signal is configured to indicate that the unlicensed spectrum is occupied by the second device.

In an alternative embodiment, the information included in the first indication signal includes first indication information. The first indication information is configured to indicate information of a cell to which the second device belongs. The first indication information is also configured to instruct the first device to determine whether the cell to which the second device belongs is the cell to which a first device belongs based on the first indication information. When the cell to which the second device belongs is the cell to which the first device belongs, the first target data is sent to the first target device through the licensed spectrum.

In an alternative embodiment, the first indication information includes a feature code of the cell to which the second device belongs. The feature code is configured to instruct the first device to determine whether the feature code is a feature code of the cell to which the first device belongs and determine the second device and the first device belong to the same cell when the feature code is the feature code of the cell to which the first device belongs.

In an alternative embodiment, the information included in the first indication signal includes second indication information. The second indication information is configured to indicate a physical layer identifier of the second device. The second indication information is also configured to instruct the first device to determine the physical layer identity of the second device based on the second indication information, query whether the physical layer identity of the second device is a physical layer identity of the access network device of the cell to which the first device belongs, and send the first target data to the first target device through the unlicensed spectrum when the physical layer identifier of the second device is the physical layer identifier of the access network device of the cell to which the first device belongs.

In an alternative embodiment, the information included in the first indication signal includes third indication information. The third indication information is configured to indicate that the second device is a sending end in data transmission. The third indication information is also configured to instruct the first device to stop monitoring the occupancy state of the unlicensed spectrum and send the first target data to the first target device through the unlicensed spectrum when the third indication information included in the first indication signal is obtained.

In an alternative embodiment, the information included in the first indication signal includes fourth indication information. The fourth indication information is configured to indicate a remaining time when the unlicensed spectrum is occupied by the second device. The fourth indication information is also configured to instruct the first device to monitor the occupancy state of the unlicensed spectrum again after backing off the remaining time based on the fourth indication information.

Figure 8:
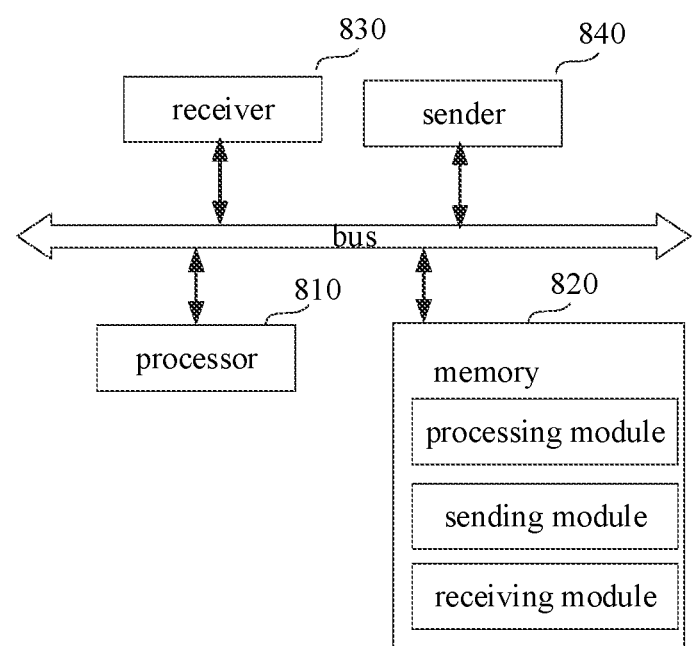
FIG. 8 is a structural block diagram illustrating an electronic device according to an exemplary embodiment of the disclosure.

FIG. 8 illustrates a structural block diagram of an electronic device according to an exemplary embodiment of the disclosure. The electronic device includes a processor 810, a memory 820, a receiver 830, and a sender 840.

The processor 810 is respectively connected to the memory 820, the receiver 830, and the sender 840 via a bus.

The receiver 830 and the sender 840 are configured to communication with other electronic devices.

The processor 810 includes one or more processing cores. The processor 810 is operated by running operating systems or application program modules to implement the communication methods in the unlicensed spectrum in various method embodiments described above.

Optionally, the memory 820 may store operating systems and application program modules required by at least one function. Optionally, the applications module includes: a receiving module, a sending module, and a processing module. The receiving module is configured to implement the actions related to receiving; the sending module is configured to implement the actions related to sending; and the processing module is configured to implement the actions related to processing.

In addition, the memory 820 may be implemented by any type of volatile or non-volatile storage devices or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, magnetic disks or optical disks.

Those skilled in the art may understand that the structure illustrated in FIG. 8 does not constitute the limitation to the above-mentioned electronic device, and may include more or fewer components than those illustrated in the figures, or a combination of certain components, or different components.

The embodiments of the disclosure also provide a computer-readable medium having at least one instruction stored thereon. The at least one instruction is loaded and executed by a processor to implement the communication method in the unlicensed spectrum in various embodiments described above.

The embodiments of the disclosure also provide a computer program product that stores at least one instruction. The at least one instruction is loaded and executed by a processor to implement the communication method in the unlicensed spectrum in various embodiments described above.

It should be understood that the term "plurality" mentioned herein refers to two or more. The term "and/or" describes an association relationship between the associated objects, indicating that there may be three types of relationships. For example, A and/or B may mean: A alone exists, A and B exist at the same time, and B exists alone. The character "/" generally indicates an "or" relationship between the associated objects.

The sequence numbers of the above-described embodiments of the disclosure are only for description, and do not represent the advantages and disadvantages of the embodiments.

Those skilled in the art may understand that all or part of the steps in the above-described embodiments may be completed in hardware or by instructing relevant hardware with programs. The program may be stored in a computer-readable storage medium. The above-mentioned storage medium may be a read-only memory, a magnetic disk or an optical disk, etc.

The above are only the preferred embodiments of the disclosure and are not intended to limit the disclosure. Any modification, equivalent replacement, improvement, etc. made within the spirit and principle of the disclosure shall be included in the protection scope of the disclosure.

What is claimed is:

1. A communication method in an unlicensed spectrum, comprising:
   monitoring by a first device, an occupancy state of an unlicensed spectrum, wherein the occupancy state comprises an occupied state or an idle state;
   stopping monitoring by the first device, the occupancy state of the unlicensed spectrum when a first indication signal sent by a second device that occupies the unlicensed spectrum is detected, wherein the first indication signal is configured to indicate that the unlicensed spectrum is occupied by the second device; and
   obtaining by the first device, information included in the first indication signal and executing a target detection behavior based on the information included in the first indication signal.

2. The method of claim 1, wherein the information included in the first indication signal comprises first indication information for indicating information of a second cell to which the second device belongs;
   obtaining by the first device, the information included in the first indication signal and executing the target detection behavior based on the information included in the first indication signal, comprises:
   obtaining by the first device, the first indication information included in the first indication signal, and determining whether the second cell is a first cell to which the first device belongs based on the first indication information; and
   sending by the first device, first target data to a first target device through the unlicensed spectrum when the second cell is the first cell.

3. The method of claim 2, wherein the first indication information comprises a second feature code of the second cell;
   determining by the first device, whether the second cell is the first cell based on the first indication information, comprises:
   determining by the first device, whether the second feature code is a first feature code of the first cell; and
   determining by the first device, the second device and the first device belong to the same cell when the feature second code is the first feature code.

4. The method of claim 2, after sending by the first device, the first target data to the first target device through the unlicensed spectrum, the method further comprises:
   sending by the first device, a second indication signal after a preset time, wherein the second indication signal is configured to indicate that the unlicensed spectrum is occupied by the first device;
   or,
   sending by the first device, the second indication signal every preset time interval;
   wherein the second indication signal comprises at least one of fifth indication information, sixth indication information, seventh indication information, and eighth indication information;
   the fifth indication information is configured to indicate information of the first cell;
   the sixth indication information is configured to indicate a unique identifier information of the first device, in which the unique identifier information comprises a device identifier of the first device when the first device is a user terminal and the unique identifier information comprises a first physical layer identifier of the first device when the first device is an access network device;

the seventh indication information is configured to indicate that the first device is a sending end in data transmission;

the eighth indication information is configured to indicate a remaining time when the unlicensed spectrum is occupied by the first device.

5. The method of claim 1, wherein the information included in the first indication signal comprises second indication information for indicating a second physical layer identifier of the second device;

obtaining by the first device, the information included in the first indication signal and executing the target detection behavior based on the information included in the first indication signal, comprises:

obtaining by the first device, the second indication information included in the first indication signal, and determining the second physical layer identifier based on the second indication information;

querying by the first device, whether the second physical layer identifier is a first physical layer identifier of the access network device of the first cell; and sending by the first device, the first target data to the first target device through the unlicensed spectrum when the second physical layer identifier is the first physical layer identifier.

6. The method of claim 1, wherein the information included in the first indication signal comprises third indication information for indicating that the second device is a sending end in data transmission;

obtaining by the first device, the information included in the first indication signal and executing the target detection behavior based on the information included in the first indication signal, comprises:

sending by the first device, the first target data to the first target device through the unlicensed spectrum when the third indication information included in the first indication signal is obtained.

7. The method of claim 1, wherein the information included in the first indication signal comprises fourth indication information for indicating a remaining time when the unlicensed spectrum is occupied by the second device;

obtaining by the first device, the information included in the first indication signal and executing the target detection behavior based on the information included in the first indication signal, comprises:

obtaining by the first device, the fourth indication information included in the first indication signal; and monitoring by the first device, the occupancy state of the unlicensed spectrum again after backing off the remaining time based on the fourth indication information.

8. A communication method in an unlicensed spectrum, comprising:

monitoring by a second device, an occupancy state of an unlicensed spectrum, wherein the occupancy state comprises an occupied state or an idle state;

occupying by the second device, the unlicensed spectrum for sending second target data to the second target device when it is monitored by the second device that the unlicensed spectrum is in the idle state;

sending by the second device, a first indication signal, so that when the first indication signal is detected by a first device that monitors the occupancy state of the unlicensed spectrum, monitoring the occupancy state of the unlicensed spectrum is stopped, information included in the first indication signal is obtained and a target detection behavior is executed based on the information included in the first indication signal, wherein the first indication signal is configured to indicate that the unlicensed spectrum is occupied by the second device.

9. The method of claim 8, wherein the information included in the first indication signal comprises first indication information for indicating information of a second cell to which the second device belongs;

the first indication information is also configured to instruct the first device to determine whether the second cell is a first cell to which the first device belongs based on the first indication information and send first target data to the first target device through the unlicensed spectrum when the second cell is the first cell.

10. The method of claim 9, wherein the first indication information comprises a second feature code of the second cell; and the second feature code is configured to instruct the first device to determine whether the second feature code is a first feature code of the first cell and determine the second device and the first device belong to the same cell when the second feature code is the first feature code.

11. The method of claim 9, wherein the information included in the first indication signal comprises second indication information for indicating a second physical layer identifier of the second device;

the second indication information is also configured to instruct the first device to determine the second physical layer identifier based on the second indication information, query whether the second physical layer identifier is a first physical layer identifier of the access network device of the first cell, and send the first target data to the first target device through the unlicensed spectrum when the second physical layer identifier is the first physical layer identifier.

12. The method of claim 9, wherein the information included in the first indication signal comprises third indication information for indicating that the second device is a sending end in data transmission;

the third indication information is also configured to instruct the first device to send the first target data to the first target device through the unlicensed spectrum when the third indication information included in the first indication signal is obtained.

13. The method of claim 8, wherein the information included in the first indication signal comprises fourth indication information for indicating a remaining time when the unlicensed spectrum is occupied by the second device;

the fourth indication information is also configured to instruct the first device to monitor the occupancy state of the unlicensed spectrum again after backing off the remaining time based on the fourth indication information.

14. An electronic device, comprising:

a processor; and a memory stored with computer programs executable by the processor, wherein the processor is configured to:

monitor an occupancy state of an unlicensed spectrum, wherein the occupancy state comprises an occupied state or an idle state;

stop monitoring the occupancy state of the unlicensed spectrum when a first indication signal sent by a second device that occupies the unlicensed spectrum is detected, wherein the first indication signal is configured to indicate that the unlicensed spectrum is occupied by the second device; and obtain information included in the first indication signal and executing a target detection behavior based on the information included in the first indication signal.

15. The electronic device of claim 14, wherein the information included in the first indication signal comprises first indication information for indicating information of a second cell to which the second device belongs;

wherein the processor is further configured to:

obtain the first indication information included in the first indication signal, and determine whether the second cell is a first cell to which the electronic device belongs based on the first indication information; and send first target data to a first target device through the unlicensed spectrum when the second cell is the first cell.

16. The electronic device of claim 15, wherein the first indication information comprises a second feature code of the second cell;

wherein the processor is further configured to:

determine whether the second feature code is a first feature code of the first cell; and determine the second device and the electronic device belong to the same cell when the feature second code is the first feature code.

17. The electronic device of claim 15, wherein the processor is further configured to:

send a second indication signal after a preset time, wherein the second indication signal is configured to indicate that the unlicensed spectrum is occupied by the electronic device; or send the second indication signal every preset time interval;

wherein the second indication signal comprises at least one of fifth indication information, sixth indication information, seventh indication information, and eighth indication information;

the fifth indication information is configured to indicate information of the first cell;

the sixth indication information is configured to indicate a unique identifier information of the electronic device, in which the unique identifier information comprises a device identifier of the electronic device when the electronic device is a user terminal and the unique identifier information comprises a first physical layer identifier of the electronic device when the electronic device is an access network device;

the seventh indication information is configured to indicate that the electronic device is a sending end in data transmission;

the eighth indication information is configured to indicate a remaining time when the unlicensed spectrum is occupied by the electronic device.

18. The electronic device of claim 14, wherein the information included in the first indication signal comprises second indication information for indicating a second physical layer identifier of the second device;

wherein the processor is further configured to:

obtain the second indication information included in the first indication signal, and determine the second physical layer identifier based on the second indication information;

query whether the second physical layer identifier is a first physical layer identifier of the access network device of the first cell; and send the first target data to the first target device through the unlicensed spectrum when the second physical layer identifier is the first physical layer identifier.

19. The electronic device of claim 14, wherein the information included in the first indication signal comprises third indication information for indicating that the second device is a sending end in data transmission;

wherein the processor is further configured to:

send the first target data to the first target device through the unlicensed spectrum when the third indication information included in the first indication signal is obtained.

20. The electronic device of claim 14, wherein the information included in the first indication signal comprises fourth indication information for indicating a remaining time when the unlicensed spectrum is occupied by the second device;

wherein the processor is further configured to:

obtain the fourth indication information included in the first indication signal; and monitor the occupancy state of the unlicensed spectrum again after backing off the remaining time based on the fourth indication information.

* * * * *